United States Patent
Murthy

(10) Patent No.: US 8,640,084 B2
(45) Date of Patent: Jan. 28, 2014

(54) GENERATING VALIDATION TEST SUITES

(75) Inventor: Praveen K. Murthy, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1172 days.

(21) Appl. No.: 12/415,963

(22) Filed: Mar. 31, 2009

(65) Prior Publication Data

US 2010/0251209 A1    Sep. 30, 2010

(51) Int. Cl.
*G06F 9/44* (2006.01)

(52) U.S. Cl.
USPC .......................................... 717/104; 717/124

(58) Field of Classification Search
USPC .......... 717/104, 124; 719/315–316; 703/1–22
See application file for complete search history.

(56) References Cited

U.S. PATENT DOCUMENTS

| | | | |
|---|---|---|---|
| 5,761,408 A * | 6/1998 | Kolawa et al. ............... | 714/38.1 |
| 6,405,361 B1 * | 6/2002 | Broy et al. .................... | 717/104 |
| 6,505,342 B1 * | 1/2003 | Hartmann et al. ............ | 717/104 |
| 7,275,231 B2 | 9/2007 | Murthy et al. ................ | 716/16 |
| 7,590,520 B2 * | 9/2009 | Nachmanson et al. ........ | 703/22 |
| 2001/0046061 A1 * | 11/2001 | Schwarz et al. ............. | 358/1.13 |
| 2002/0194393 A1 * | 12/2002 | Hrischuk et al. ............. | 709/318 |
| 2003/0028826 A1 * | 2/2003 | Balluff .......................... | 714/44 |
| 2003/0046609 A1 * | 3/2003 | Farchi et al. .................. | 714/30 |
| 2003/0159087 A1 * | 8/2003 | Grieskamp et al. ........... | 714/37 |
| 2009/0235226 A1 * | 9/2009 | Murthy et al. ................ | 717/104 |

OTHER PUBLICATIONS

Office Action for U.S. Appl. No. 12/415,934, Sep. 19, 2011.
Office Action for U.S. Appl. No. 12/415,934, Nov. 9, 2011.
Lian, Jiexin et al; "Simulation-based analysis of UML statechart diagrams: methods and case studies," *Software Qual J*,16:45-78, 2008 Available online May 2007.
OMG, "Unified Modeling Language: Superstructure," version 2.0, pp. 1-710, Aug. 2005.
Murthy, Praveen, "High level systems validation using hierarchical message sequence charts," Abstract for Colloquium, Center for Embedded Computer Systems, at UC Irvine, Apr. 26, 2007.
Murthy, Praveen et al.; "High Level Hardware Validation Using Hierarchical Message Sequence Charts"; pp. 167-172; *HLDVT '04, Proceedings of the High-Level Design Validation and Test Workshop*, 2004.
Response to Nonfinal Office Action for U.S. Appl. No. 12/415,934, Oct. 31, 2011.
Notice of Appeal for U.S. Appl. No. 12/415,934, Jan. 20, 2012.
Pre-Brief Conference Request for Review for U.S. Appl. No. 12/415,934, Jan. 20, 2012.
USPTO, Notice of Panel Decision for U.S. Appl. No. 12/415,934, Feb. 24, 2012.
Appeal Brief for U.S. Appl. No. 12/415,934, Mar. 19, 2012.
USPTO, Examiner's Answer to Appeal Brief for U.S. Appl. No. 12/415,934, Jun. 15, 2012.
Reply Brief for U.S. Appl. No. 12/415,934, Aug. 14, 2012.
USPTO, Appeal Docketing Notice for U.S. Appl. No. 12/415,934, Sep. 7, 2012.

* cited by examiner

*Primary Examiner* — John Chavis
*Assistant Examiner* — Sergio J Curbelo, III
(74) *Attorney, Agent, or Firm* — Baker Botts L.L.P.

(57) ABSTRACT

In one embodiment, a method includes accessing a modeling language representation of a system under test. The representation includes one or more Message Sequence Charts (MSCs). One or more of the MSCs includes one or more conditional constructs including at least one or more guards or one or more loops. The method includes generating one or more use scenarios based on the modeling language representation and generating one or more validation test suites based on the one or more use scenarios.

26 Claims, 4 Drawing Sheets

GENERATING VALIDATION TEST SUITES

TECHNICAL FIELD

The present disclosure generally relates to testing hardware or software.

BACKGROUND

Advances in hardware and software have provided a foundation for increasingly complicated designs that are increasingly difficult to validate or (verify). Validation (or verification) typically refers to checking or testing whether a hardware or software system or design meets one or more specifications and fulfills its intended purpose. Many techniques for such validation (or verification) are inefficient, less than comprehensive, and prone to error.

DESCRIPTION OF EXAMPLE EMBODIMENTS

Figure 1:
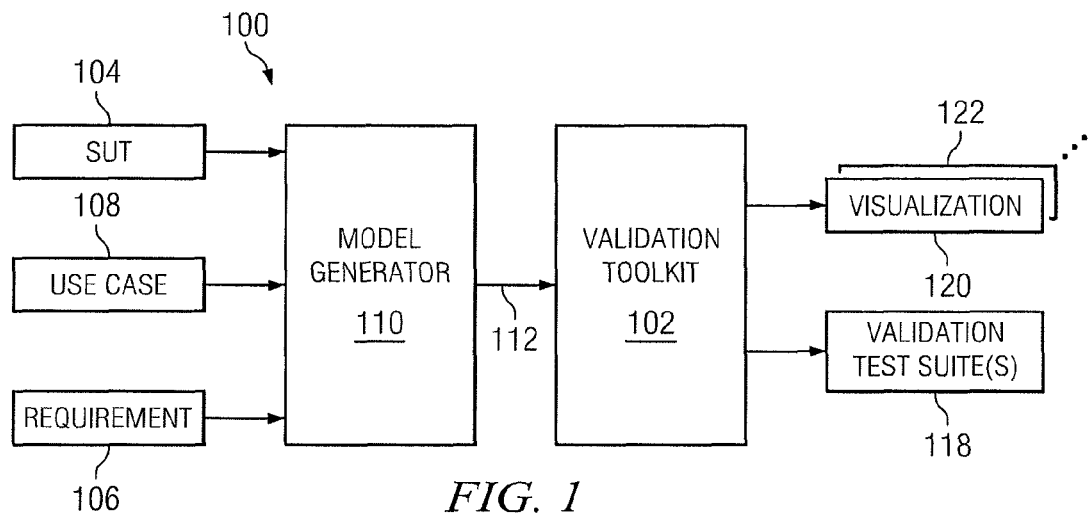
FIG. 1 illustrates an example environment of an example validation toolkit.

FIG. 1 illustrates an example environment 100 of a validation toolkit 102. In particular embodiments, validation toolkit 102 facilitates the validation of a software or hardware (or combination thereof) device or system under test (SUT) 104, testing whether the system satisfies one or more requirements or specifications 106 when carrying out one or more use cases 108 and outputting the results of such testing. By way of example, reference to a software system may encompass an application or a program, and vice versa, where appropriate. A requirement 106 of SUT 104 may be a particular behavior of the system that must occur or a particular property that must hold true during execution of the system. In some embodiments, inter-object specifications may be referred to as requirements while intra-object specifications may be referred to as executable specifications. Reference to behavior or a property may encompass a requirement 106, and vice versa, where appropriate. A use case 108 for SUT 104 may be a representation of a scenario that SUT 104 may encounter when a user uses SUT 104, such as for example a series of particular inputs from the user received by SUT 104 in a particular sequence. Reference to a scenario may encompass a use case, and vice versa, where appropriate. In particular embodiments, SUT 104 is a design prototype produced during development of a product. In other embodiments, SUT 104 may be a state machine or other representation generated by validation toolkit 102.

A user of validation toolkit 102 may specify one or more specifications or requirements 106 and/or use cases 108 for SUT 104 and communicate them to model generator 110 as input. Model generator 110 may access the SUT 104 for additional input. Model generator 110 may then generate a model 112 of SUT 104. In a particular embodiment, model generator 110 includes a graphical user interface (GUI) that facilitates user interaction in generating model 112 using a formal visual language or graphical modeling language. The graphical modeling language may be any suitable language and the model 112 may be created using any appropriate programming language or development tool.

In particular embodiments, model 112 is a high level design specification of SUT 104 generated using Unified Modeling Language (UML; e.g., UML 2.0). Broadly, UML is a standardized general purpose modeling language primarily utilized in the field of software engineering, and to a lesser extent, hardware engineering. UML includes a set of graphical notation techniques to create abstract models of specific systems. More particularly, UML is a collection of modeling notations for specifying different artifacts, such as requirements and design, of software and/or hardware systems. By way of example, UML may be utilized to facilitate the specification, visualization, construction and documentation of the artifacts of an object-oriented software-intensive system under development. However, UML may also be utilized to model other systems both prior to implementation or production as well as after production.

UML model 112 generally includes one or more diagrams used to specify or describe different attributes of SUT 104. In a practical application for a system of realistic size, tens or hundreds (or more) of UML diagrams may be used to accurately and completely describe SUT 104. Some or all of these UML diagrams may be arranged hierarchically. In other words, various UML diagrams may be incorporated into other higher level UML diagrams. In this way, a high level UML diagram may provide a more concise, simple, and visually pleasing overview of SUT 104 by referencing lower level UML diagrams rather than displaying all the details of each lower level UML diagram in the hierarchical higher level UML diagram (the reverse of this is known as flattening, whereby a hierarchically arranged UML is fleshed out to include and display all the details of the lower level UML diagrams that constitute the higher level UML diagram).

Figure 2:
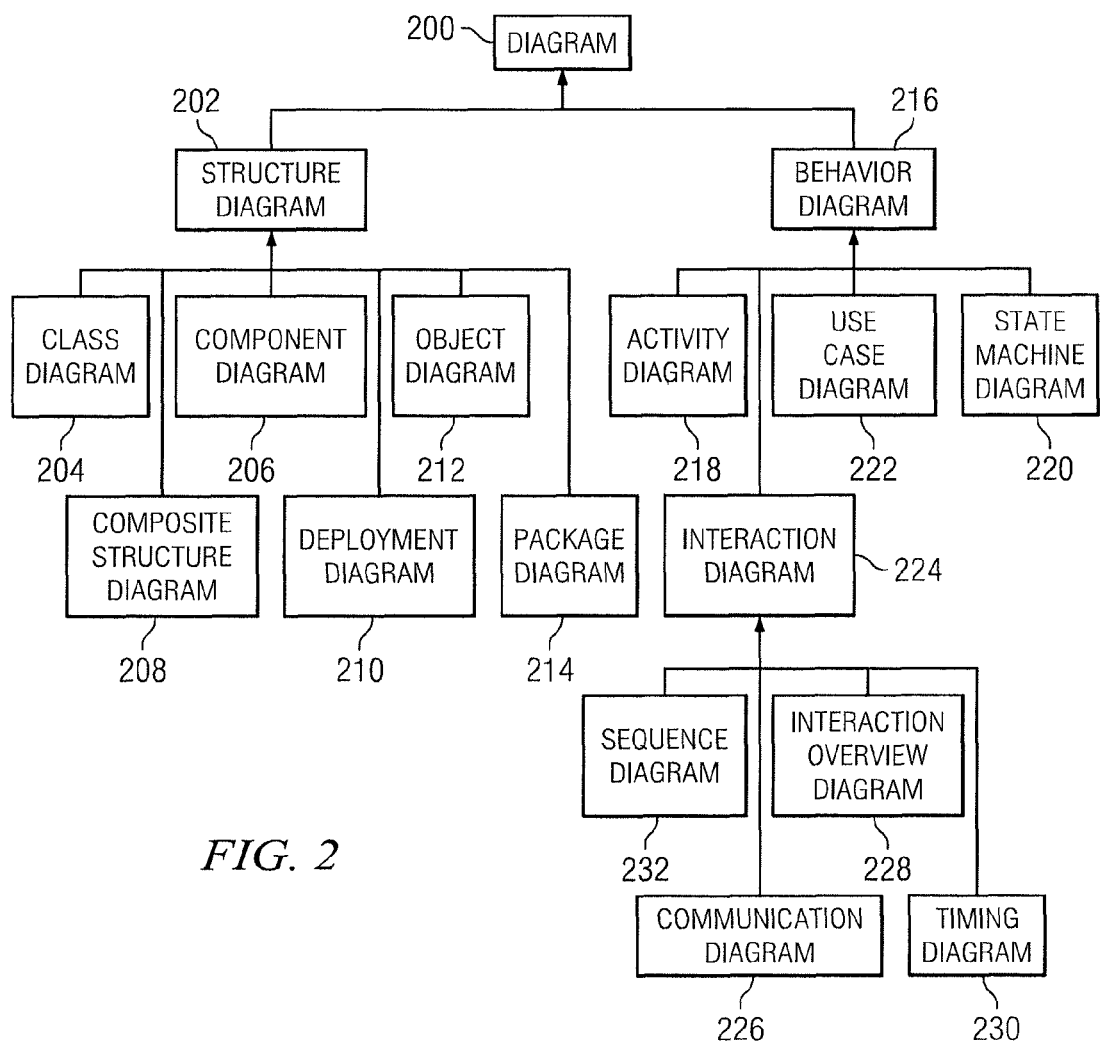
FIG. 2 illustrates an example hierarchical arrangement of Unified Modeling Language diagrams.

UML diagrams may be generally classified into one of three categories based on what view they provide of the system model. These categories may be generally referred to as structural diagrams, behavioral diagrams, and interactions diagrams. In particular, UML 2.0 provides 13 different types of diagrams divided into these three categories. These diagrams can be categorized hierarchically as illustrated in FIG. 2.

A diagram 200 includes a subset of diagrams that may include a structure diagram 202 and a behavior diagram 216. A structural (or static) diagram 202 provides a view of the static structure of the system utilizing, by way of example, objects, attributes, operations, and relationships. Structure diagrams 202 include, by way of example, class diagrams 204, component diagrams 206, composite structure diagrams 208, deployment diagrams 210, object diagrams 212, and package diagrams 214.

A behavioral (or dynamic) diagram 216 emphasizes the dynamic behavior of the system by showing collaborations among objects and changes to the internal states of objects. Behavioral diagrams 216 include, by way of example, activity diagrams 218, state (or state machine) diagrams 220, and use case diagrams 222.

Interaction diagrams 224 may be considered a subset of behavioral diagrams 216. Interaction diagrams 224 emphasize the flow of control and data among the things in the system being modeled. Interaction diagrams include, by way of example, communication diagrams 226, interaction overview diagrams 228, timing diagrams 230, and sequence diagrams 232.

A sequence diagram in UML is a variety of interaction diagram that shows particularly how objects or processes operate with one another and in what order. More particularly, a primary use of a sequence diagram is to show the interaction between objects in the sequential order that those interactions occur. That is, a sequence diagram may be used to define event sequences that result in some desired outcome. Sequence diagrams may be utilized to validate and flesh out the logic of a use (or usage) scenario. A use scenario as used herein may be defined as a description of a potential way that SUT 104 is used. More particularly, a use scenario may represent a particular order and combination of messages communicated between two or processes. The logic of a usage scenario may be part of a use case, perhaps an alternate course; one entire pass through a use case, such as the logic described by the basic course of action or a portion of the basic course of action plus one or more alternate scenarios; or a pass through the logic contained in several use cases. Sequence diagrams facilitate the exploration of a design as they enable a user to visually step through the invocation of operations defined by the user's classes.

A sequence diagram may be considered a UML construct of a Message Sequence Chart (MSC). As those of skill in the art will appreciated, MSCs may be utilized in specifying scenarios that describe patterns of interactions between processes or objects. By way of example, in many object-oriented system development methodologies, a user first specifies a system's use cases and some specific instantiations of each use case are then described using MSCs.

While sequence diagrams are often utilized in software development, an organizations business staff may also utilize sequence diagrams to communicate how the business currently works by showing how various business objects interact. Besides documenting an organization's current model, a sequence diagram may also be used to specify requirements for a future business system implementation.

One of the primary uses of sequence diagrams is in the transition from requirements expressed as use cases to the next and more formal level of refinement. Use cases are often refined into one or more sequence diagrams. As eluded to earlier, in addition to their use in designing new systems, sequence diagrams may be used to document how objects in an existing (or legacy) system currently interact. This may be useful, for example, when transitioning a system to another person or organization.

Figure 3:
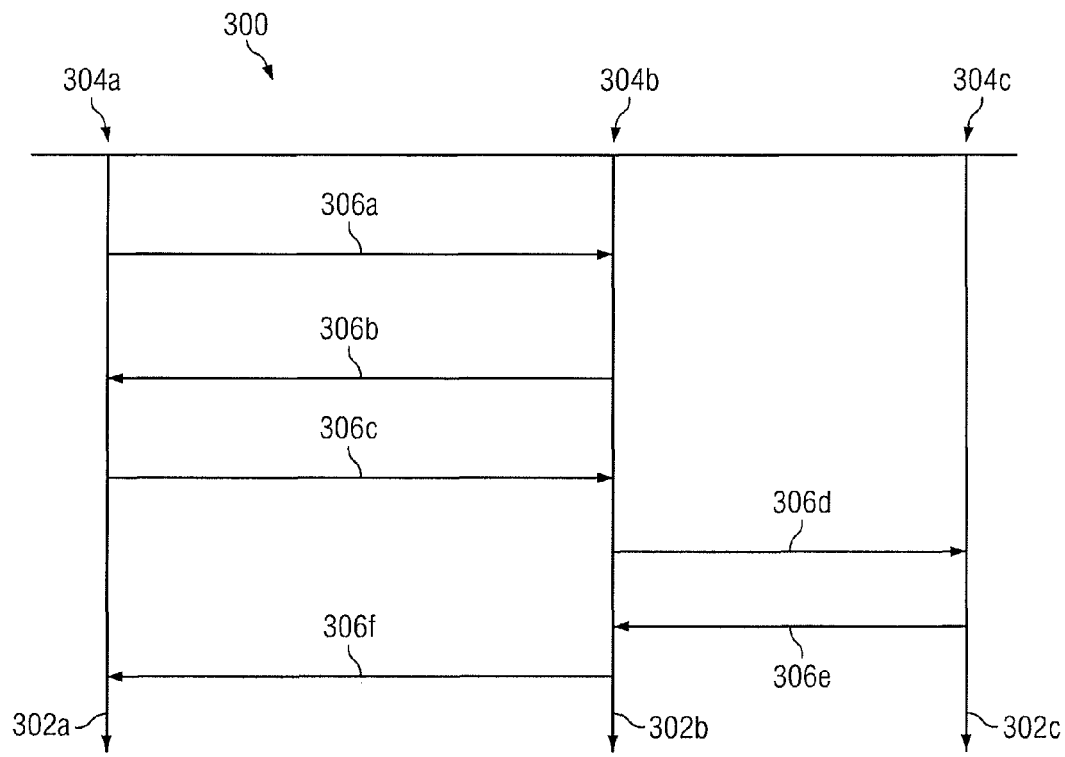
FIG. 3 illustrates an example sequence diagram.

FIG. 3 illustrates an example sequence diagram 300. The parallel vertical lines (or lifelines) 302a, 302b, and 302c show different processes or objects 304a, 304b, and 304c that run or operate simultaneously, while the horizontal arrows 306a, 306b, 306c, 306d, 306e, and 306f represent the messages exchanged between them in the order in which they occur (time flows from top to bottom along the vertical lines). In this way, a sequence diagram provides a specification of runtime scenarios in a graphical manner. Some systems have simple dynamic behavior that may be expressed in terms of specific sequences of messages between a small, fixed number of objects or processes. In such cases, sequence diagrams may completely specify the system's behavior. However, a system's behavior is often much more complex such as, by way of example, when there are many branch points (e.g., exceptions), when there are complex iterations, or synchronization issues such as resource contention. In such cases, sequence diagrams may be used in conjunction with other behavioral diagrams such as state diagrams (state charts) and the other diagrams referred to above.

In many practical systems, there are times when one or more conditions must be met for a message to be sent to an object. Thus, when modeling object interactions, conditional constructs such as guards and loops may be utilized throughout UML diagrams to control flow. In particular embodiments, the elements in a diagram, such as a UML sequence diagram, may be specified with provisional or mandatory guards, corresponding to possible and necessary conditions, respectively. More particularly, if a provisional guard holds during an execution, control passes to the object immediately after the guard, and if it is false, the context in which this condition occurs is exited and execution may continue. By way of example, provisional guards may be used to program branches and if-then-else constructs. UML also enables bounded and unbounded loops, which, when combined with provisional guards, may be used to construct while loops and repeat-until loops. In contrast, a mandatory guard condition must always be true. If an execution reaches a mandatory guard that evaluates to false, this is a violation of the requirements of the SUT 104.

UML 2.0 introduced structured control (or conditional) constructs, such as InteractionUse and CombinedFragment to represent more complex flow of control in a sequence diagram. InteractionUse allows one sequence diagram to refer to another sequence diagram. Generally, a CombinedFragment is a form of a guard and may be used to group sets of messages together to show conditional flow in a sequence diagram. CombinedFragments represent different types of flows of control, such as concurrency, choice, and loops. A CombinedFragment includes an InteractionOperator and one or more InteractionOperands. An InteractionOperand is an InteractionFragment and may contain an InteractionConstraint, which may be a Boolean expression. InteractionOperators include, by way of example, Alternatives (Alt), Options (Opt), Breaks, Parallels, Critical Regions, and Loops. The specifics of each of these InteractionOperators are known in the art and will not be described in further detail here.

Given its power and ability to incorporate conditional constructs, UML 2.0 is increasingly being used for formal specification of software and hardware systems, and particularly, at the design and requirements stage of the design process. However, the advantage of using formal specifications may be lost if there is no method by which the formal specification can be translated into an implementation, and so that the implementation can be checked systematically and automatically (since designs are large and human-based testing is error-prone and subject to incompleteness). Checking the implementation against the specification is especially important if it cannot be proven that the implementation meets the specification requirements (for example, this may be the case if the implementation is not generated systematically and in a provably correct way from the specification). As such, methods that generate validation suites from the formal specifications (e.g., UML) to test implementations are desirable.

Figure 4:
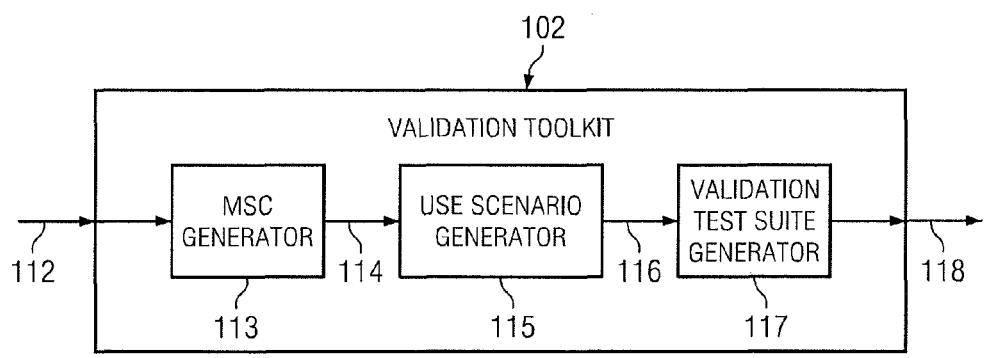
FIG. 4 illustrates an example embodiment of a validation toolkit.

Particular embodiments relate to a method by which implementations of UML behavioral diagrams (e.g., state diagrams, sequence diagrams, or other interaction and behavior diagrams), that are used in arbitrary combinations hierarchically to describe complex system behavior of SUT 104, can be validated systematically and automatically, and in some embodiments, with guarantees of 100% usage scenario coverage. FIG. 4 illustrates an example embodiment of validation toolkit 102. In particular embodiments, validation toolkit 102 receives UML model 112 of SUT 104 and automatically generates guarded hierarchical MSCs (hMSCs) 114. More particularly, validation toolkit 102 includes an MSC generator 113 that takes as input UML model 112 (or a portion thereof) and generates MSCs 114 based on UML model 112. In even more particular embodiments, MSC generator 113 generates guarded hMSCs 114 that describe the behavior of SUT 104 based on the behavioral diagram portions of UML model 112. In particular embodiments, the UML behavioral diagrams of UML model 112, and particularly the UML sequence diagrams, are transformed into mathematically equivalent guarded hMSCs 114.

As described above, in particular embodiments, guarded hMSCs 114 are enhanced MSCs that include transitions that support any and all of the conditional constructs (e.g., guards and loops) outlined above. By way of example, guarded hMSCs 114 may include transitions that incorporate conditional constructs mathematically similar to the Alternatives, Options, Breaks, Parallels, Critical Regions, and Loops that may be specified in the UML model 112. Furthermore, guarded hMSCs 114 may be either deterministic or non-deterministic based on the needs of a particular application. Deterministic systems may be characterized as having a fully determinate control flow. In other words, during an execution of an algorithm or computation (e.g., represented by a UML diagram, hMSC, or a set of program instructions), there is no choice for the execution of an operation in a next step; there is only one possibility. Said another way, deterministic systems may be characterized as having at most one instruction associated with any given internal state or as having each state depend only on the immediately previous state, as opposed to having some states depend on backtracking where there may be multiple possible next actions and no way to choose between them except by trying each one and backtracking upon failure. This is in contrast to conventional MSCs, which are non-deterministic. In a non-deterministic system, there may be multiple choices for the "next step" during the execution of the algorithm or computation, and different "runs" of the system may make different choices at a particular decision point where multiple choices are present.

Furthermore, in particular embodiments, validation toolkit 102 includes a use scenario generator 115 that receives as input guarded hMSCs 114 and automatically generates use (or usage) scenarios 116. In particular embodiments, validation toolkit 102 further includes a validation test suite generator 117 that receives as input use scenarios 116 and automatically generates executable validation test suite(s) 118 to verify and validate SUT 104. By way of example, the validation test suite(s) 118 may be generated in languages such as VERILOG, SYSTEMC, or JAVA. In particular embodiments, use scenarios 116 are guaranteed to be "complete" in the sense of exercising every possible behavior subject to the specified coverage requirements.

A particular advantage of particular embodiments is that UML (e.g., UML 2.0) is used as the starting graphical modeling language. Thus, a user or designer does not need to learn a new modeling language (such as hMSC or the underlying Extensible Markup Language (XML) or XML Metadata Interchange (XMI) specification code). With a UML model 112, a user is able to generate a graphical modeling language representation of an entire SUT 104, both structurally and behaviorally. In contrast, conventional (non-guarded) MSCs are only able to model aspects of the behavior of a given system. Furthermore, to the present inventor's understanding, conventional MSC generators are unable to generate guarded MSCs. That is, conventional MSC generators are unable to generate MSCs incorporating conditional constructs such as guards and loops described above. As those of skill in the art will appreciate, to accurately and completely model a system's behavior, conditional constructs such as guards and loops are often required. UML, and particularly UML 2.0, provides a powerful framework for modeling a system with a wide variety of conditional constructs such as guards and loops. Also, in addition to its power and ease of use, UML is conventionally more widely used than MSCs to model SUTs.

Particular embodiments are fully automatic in that they do not require the user to generate any other model or diagram or provide any other specifications, requirements, or use cases other than those already described by UML model 112. That is, in particular embodiments, the conversion from UML model 112 to guarded hMSCs 114 is fully automatic, the generation of use scenarios 116 subject to coverage requirements is fully automatic, and the generation of validation test suite(s) 118 in the form of executable code is fully automatic. In particular embodiments, the generated validation test suite(s) 118 have guarantees of 100% scenario coverage. In contrast, 100% scenario coverage is almost impossible to ensure if the test suites are being generated manually, as is the conventional practice. For a complex hierarchical design, it is virtually impossible for a human being to enumerate all possible scenarios that are possible in the SUT 104.

Figure 5A:
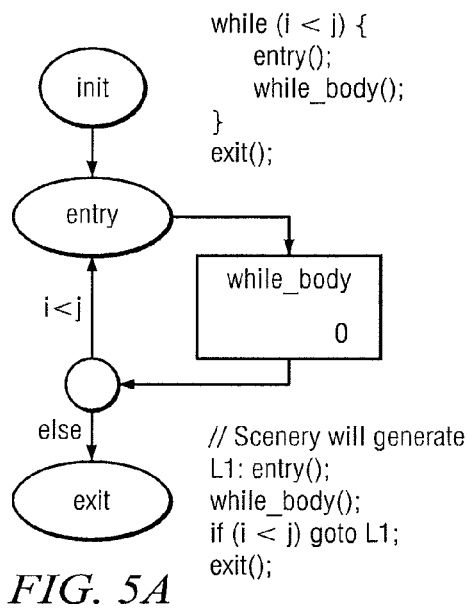
FIG. 5A illustrates an example embodiment of a portion of a guarded hierarchical Message Sequence Chart that models a "while" loop.

As described above, validation toolkit 102 includes an MSC generator 113 that automatically generates guarded hMSCs; that is, for example, hMSCs that incorporate conditional constructs mathematically similar to the conditional constructs specified in the UML behavioral diagrams of UML model 112. By way of example, FIG. 5A illustrates a particular embodiment of a portion of a guarded hMSC that models a "while" loop as shown, by way of example, below.

```
while (i < j) {
    entry( );
    while_body( );
}
exit( );
```

In this way, the resultant hMSC 114 utilizes a guard construct rather than a conventional increment counter and is able to support a loop with unspecified lower and upper bounds.

Figure 5B:
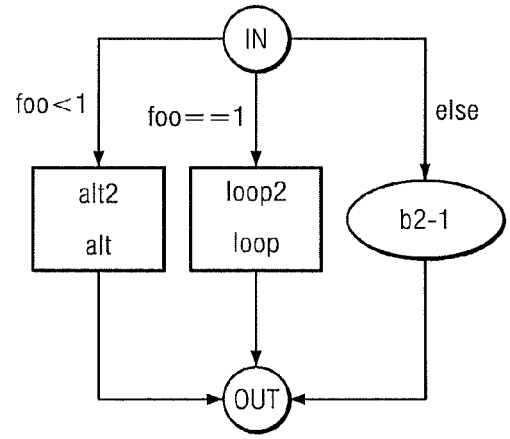
FIG. 5B illustrates an example embodiment of a portion of a guarded hierarchical Message Sequence Chart that models an "if-then-else" loop.

FIG. 5B illustrates an example embodiment of a portion of a guarded hMSC that models a "if-then-else" loop. Similarly, a "case" statement can also be modeled.

Although particular embodiments have been described as automatically generating hMSCs 114; that is, MSCs arranged hierarchically. In alternate embodiments, MSC generator 113 automatically generates MSCs 114 that are not arranged hierarchically, that is, flattened MSCs. In still other embodiments, validation toolkit 102 may provide a user with the option to generate one or the other. In still other embodiments, MSC generator 113 automatically generates hMSCs, but gives a user the option to flatten the hMSCs into regular MSCs.

Additionally, although particular embodiments are described as generating hMSCs 114, it should be understood that MSC generator 113 and validation toolkit 102 may not visually present the MSCs to a user. That is, in particular embodiments, MSC generator 113 generates the underlying code (e.g., XML) utilized in forming hMSCs 114, but never displays hMSCs 114 in a graphical format for presentation to a user of validation toolkit 102. In alternate embodiments, validation toolkit 102 presents the generated hMSCs 114 in graphical MSC form visually to a user. The displayed MSCs 114 may be presented hierarchically or flattened in various embodiments.

As described above, use scenario generator 115 receives guarded hMSCs 114 from MSC generator 113 and automatically generates use scenarios 116 based on the guarded hMSCs 114. More particularly, in particular embodiments scenario generator 115 receives guarded hMSCs 114 in their underlying code (e.g., XML). Scenario generator 115 may utilize any of a variety of methods to identify use scenarios 116 for use in testing SUT 104. By way of example, testing a design may include identifying and testing every hMSC 114 in a directed graph. Other embodiments may require identifying and testing every combination of two hMSCs 114 in the order indicated in the directed graph. This method may be referred to as edge coverage since it requires that every edge (i.e., transition) in the directed graph be tested. Edge coverage allows testing of every transition between MSCs. In particular embodiments, edge coverage involves the use of a postman algorithm (e.g., Chinese postman algorithm) to generate a postman tour of the directed graph. Still other embodiments may require identifying and testing every possible complete path through a directed graph. Use scenario generator 115 may be configured to identify use scenarios 116 for testing SUT 104 according to any of these embodiments. Furthermore, use scenario generator 115 may be able to identify and test other use scenarios 116 using other methods. In particular embodiments, use scenario generator 115 may be configured to identify all and generate all use scenarios 116 between MSCs 114.

As described above, validation test suite generator 117 receives use scenarios 116 from use scenario generator 115 and automatically generates one or more validation test suites 118 in the form of executable code to verify and validate SUT 104. A validation test suite 118 may, for example, act as a state machine to interact with SUT 104 according to the use scenarios 116. If SUT 104 interacts with the validation test suite(s) 118 according to the use scenarios 116 and MSCs 114, SUT 104 may be said to conform to the specifications and requirements of the UML model 112 and is thus validated. If SUT 104 fails to interact with the validation test suite(s) 118 according to the use scenarios 116 and MSCs 114, the error may be identified and investigated.

In particular embodiments, hMSCs 114 are flattened prior to generating use scenarios 116. In alternate particular embodiments, use scenarios 116 may be generated from hMSCs 114 without first flattening the hMSCs. Additionally, in particular embodiments use scenarios 116 may be tested in parallel through hierarchically arranged hMSCs 114.

Using the validation test suite(s) 118, a state machine may run on validation toolkit 102 and interact with SUT 104 via a signal interface. In such embodiments, messages may be communicated through the signal interface between validation toolkit 102 and SUT 104 to determine whether SUT 104 transmits and receives messages according to the specifications as they are defined in UML model 112. More particularly, one or more tests may be run using the sequence of messages identified in the use scenarios 116. In alternate embodiments, SUT 104 may be the validation test suite 118 itself, that is, the validation test suite 118 may attempt to communicate with another copy of itself to determine whether the design is robust.

Figure 6:
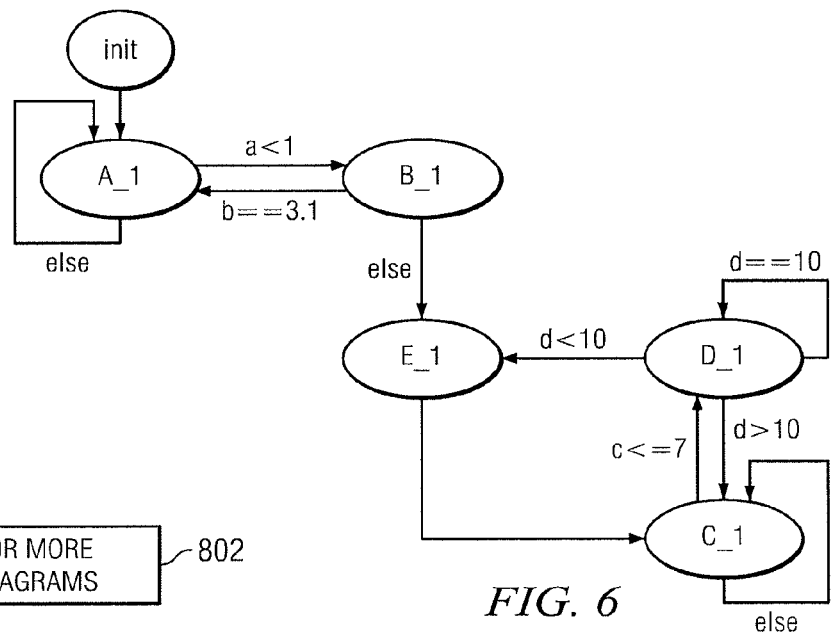
FIG. 6 illustrates an example Chinese Postman tour.

FIG. 6 illustrates an example diagram illustrating a Chinese postman tour. To implement the tour, validation toolkit 102 takes into account the conditional constructs (e.g., guards and loops) specified in hMSCs 114. An example tour through states A, B, C, D, and E may be, for example, A-B-A-A-B-E-C-D-C-C-D-D-E. In particular embodiments, validation toolkit 102 keeps track of whether or not a state has actually been visited or transition has been made so as to guarantee complete coverage. More particularly, just because the Chinese postman tour finds a path covering all edges (i.e., transitions) doesn't necessarily mean that all transitions will be covered once the guards are taken into account. Thus, validation toolkit 102 may keep track of which transitions are actually visited during execution of the validation test suite(s) 118. By way of example, validation toolkit 102 may include one or more counters to track the transitions.

Validation toolkit 102 may include one or more software components residing at one or more computer systems. Similarly, model generator 110 may include one or more software components residing at one or more computer systems. Software components of validation toolkit 102 and model generator 110 may be at one or more of the same computer systems. Requirements 106 and use cases 108 may be data provided by a user as input to model generator 110 or validation toolkit 102. Validation toolkit 102 may access the source code (e.g., XML) of UML model 112 from one or more storage devices or servers. In some particular embodiments, validation toolkit 102 may also generate visualizations 120 or 122 that represent UML model 112 and hMSCs 114, respectively. One or more output devices of the computer systems running validation toolkit 102 may communicate visualizations 120 and 122 to the user.

Figure 7:
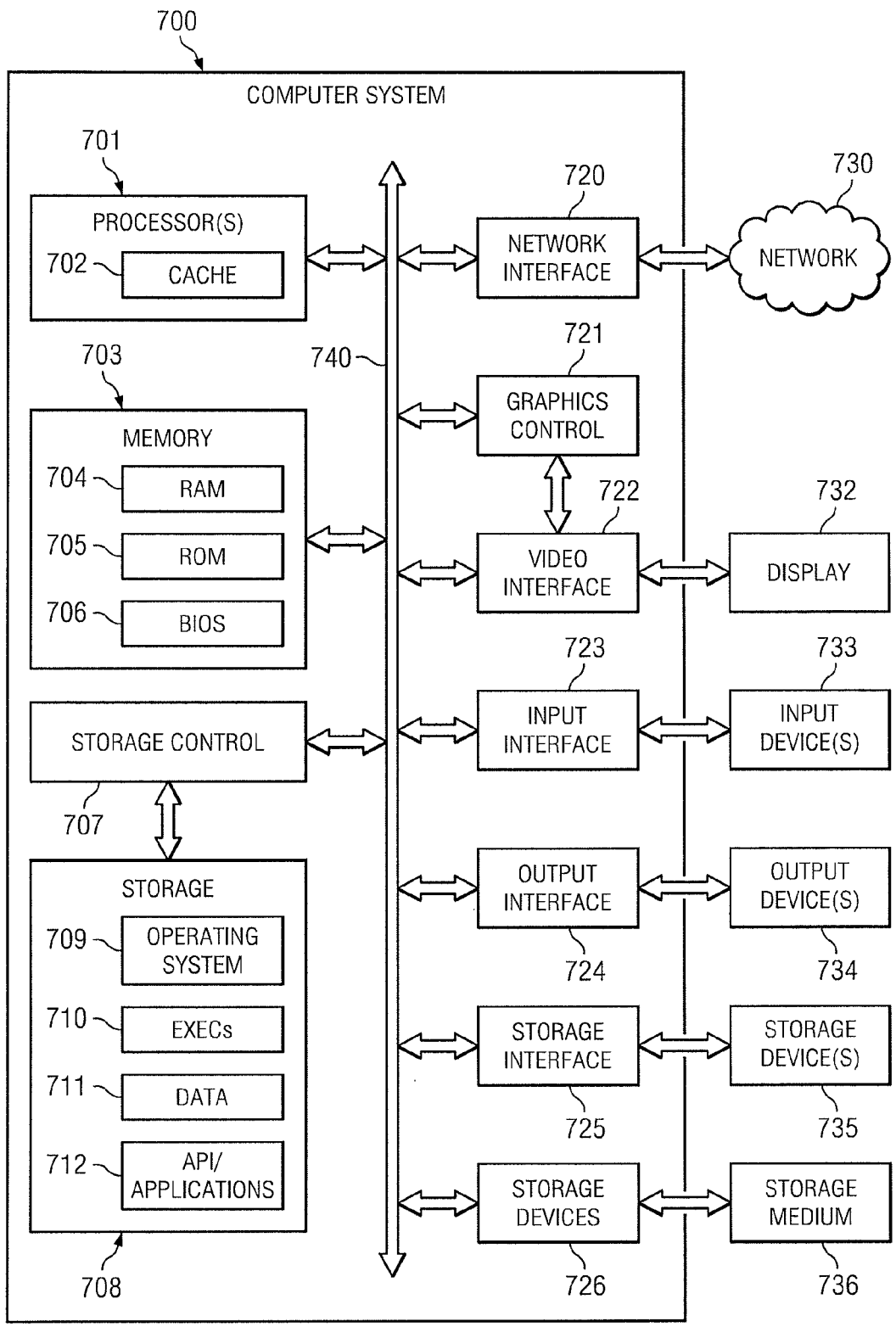
FIG. 7 illustrates an example architecture for an example computer system.

FIG. 7 illustrates an example computer system 700. Validation toolkit 102 and model generator 110 may be software components at one or more computer systems, which may be similar to example computer system 700. Particular embodiments may implement validation toolkit 102, model generator 110, or both as hardware, software, or a combination of hardware and software. As an example and not by way of limitation, one or more computer systems may execute particular logic or software to perform one or more steps of one or more processes described or illustrated with respect to validation toolkit 102, model generator 110, or both. One or more of the computer systems may be unitary or distributed, spanning multiple computer systems or multiple datacenters, where appropriate. The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM)

devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

The components in FIG. 7 are examples only and do not limit the scope of use or functionality of any hardware, software, embedded logic component, or a combination of two or more such components implementing particular embodiments. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 700 includes a display 732, one or more input devices 733 (which may, for example, include a keypad, a keyboard, a mouse, a stylus, etc.), one or more output devices 734 (which may, for example, include one or more speakers), one or more storage devices 735, and various storage media 736.

Bus 740 connects a wide variety of subsystems. Herein, reference to a bus encompasses one or more digital signal lines serving a common function, where appropriate. Bus 740 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 701 (or central processing unit(s) (CPU(s))) optionally contains a cache memory unit 702 for temporary local storage of instructions, data, or computer addresses. Processor(s) 701 are coupled to storage devices including memory 703. Memory 703 includes random access memory (RAM) 704, read-only memory (ROM) 705, and Basic Input Output System (BIOS) 706. ROM 705 may act to communicate data and instructions unidirectionally to processor(s) 701, and RAM 704 may act to communicate data and instructions bidirectionally with processor(s) 701. ROM 705 and RAM 704 may include any suitable computer-readable media described below. Fixed storage 708 is connected bidirectionally to processor(s) 701, optionally through storage control unit 707. Fixed storage 708 provides additional data storage capacity and may also include any suitable computer-readable media described below. Storage 708 may be used to store operating system 709, EXECs 710, data 711, application programs 712, and the like. Typically, storage 708 is a secondary storage medium (such as a hard disk) that is slower than primary storage. Information in storage 708 may, in appropriate cases, be incorporated as virtual memory in memory 703.

Processor(s) 701 is connected to multiple interfaces, such as graphics control 721, video interface 722, input interface 723, output interface 724, and storage interface 725. These interfaces are in turn connected to appropriate devices, as illustrated. In general, an input/output (I/O) device may be a video display, a track ball, a mouse, a keyboard, a microphone, a touch-sensitive display, a transducer card reader, a magnetic- or paper-tape reader, a tablet, a stylus, a voice or handwriting recognizer, a biometrics reader, another computer systems, or other suitable I/O device or a combination of two or more such I/O devices. Processor(s) 701 may connect to another computer system or to telecommunications network 730 through network interface 720. With network interface 720, CPU 701 may communicate with network 730 in the course of performing one or more steps of one or more processes described or illustrated herein, according to particular needs. Moreover, one or more steps of one or more processes described or illustrated herein may execute solely at CPU 701. In addition or as an alternative, one or more steps of one or more processes described or illustrated herein may execute at multiple CPUs 701 that are remote from each other across network 730.

In particular embodiments, when computer system 700 is connected to network 730, computer system 700 may communicate with other devices connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730 and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Particular embodiments include storage with one or more computer-readable media encoding computer-executable code for carrying out computer-implemented operations. The media and computer-executable code may be specially designed or created for particular embodiments or well known and available to a person having ordinary skill in the art. Examples of computer-readable media include, but are not limited to, magnetic media (such as hard disks, floppy disks, and magnetic tape), optical media (such as CD-ROMs and holographic devices), magneto-optical media (such as floptical disks), and hardware devices specially configured to store and execute code, such as application-specific ICs (ASICs), programmable logic devices (PLDs), and ROM and RAM devices. Examples of computer-code include machine code, such as code produced by a compiler, and files containing higher-level code that a computer may execute with an interpreter.

Computer system 700 may provide functionality as a result of processor(s) 701 executing software embodied in one or more computer-readable storage media, such as memory 703. Memory 703 may store software that implements particular embodiments, and processor(s) 701 may execute the software. Memory 703 may read the software from one or more other computer-readable media (such as mass storage device(s) 735) or from one or more other sources through a suitable interface, such as network interface 720. The software may cause processor(s) 701 to carry out one or more processes or one or more steps of one or more processes described or illustrated herein. Carrying out such processes or steps may include defining data structures stored in memory 703 and modifying the data structures as directed by the software. In addition or as an alternative, computer system 700 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

Figure 8:
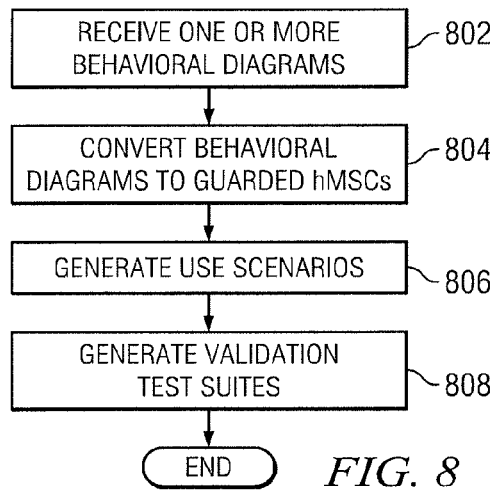
FIG. 8 illustrates an example method for automatically validating behavioral diagrams.

FIG. 8 illustrates an example method for automatically validating UML behavioral diagrams. Specifically, it illustrates the steps followed by validation toolkit 102 in receiving UML model 112 of SUT 104 and generating validation test suite(s) 118. At 802, one or more behavioral diagrams are received. By way of example, the behavioral diagrams may be UML diagrams of a UML model. In particular embodiments, the behavioral diagrams includes sequence diagrams or state diagrams (or both). At 804, the behavioral diagrams are automatically converted to guarded hMSCs. Comprehensive use scenarios are then automatically generated at 806 based on the guarded hMSCs. Validation test suite(s) are then automatically generated at 808 based on the use scenarios. The validation test suite(s) may then be utilized to validate the SUT.

Although the present disclosure describes and illustrates particular steps of the method of FIG. 8 as occurring in a particular order, the present disclosure contemplates any suitable steps of the method of FIG. 8 occurring in any suitable order. Moreover, although the present disclosure describes and illustrates particular components carrying out particular steps of the method of FIG. 8, the present disclosure contemplates any suitable combination of any suitable components carrying out any suitable steps of the method of FIG. 8.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
using one or more computer systems, accessing a modeling language representation of a system under test, the representation comprising one or more Message Sequence Charts (MSCs), one or more of the MSCs comprising one or more conditional constructs including at least one or more guards or one or more loops;
using the computer systems, generating one or more use scenarios based on the modeling language representation, wherein generating the one or more use scenarios comprises identifying and generating one or more use scenarios for each combination of two MSCs in the order indicated in a directed graph;
and using the computer systems, generating one or more validation test suites based on the one or more use scenarios.

2. The method of claim 1, wherein one or more of the one or more conditional constructs comprise one or more transitions selected from the group consisting of one or more Alternatives, Options, Breaks, Parallels, Critical Regions, or Loops specified in Unified Modeling Language (UML).

3. The method of claim 1, wherein one or more of the MSCs are hierarchically arranged MSCs.

4. The method of claim 1, wherein one or more of the MSCs are deterministic.

5. The method of claim 1, wherein one or more of the MSCs are non-deterministic.

6. The method of claim 1, wherein generating one or more use scenarios comprises identifying and generating one or more use scenarios for every MSC in a directed graph.

7. The method of claim 6, wherein generating one or more use scenarios for every MSC in a directed graph comprises using a postman algorithm to generate a postman tour of the directed graph.

8. The method of claim 6, wherein generating one or more use scenarios for every MSC in the directed graph comprises identifying and generating use scenarios for every possible complete path through the directed graph.

9. The method of claim 1, wherein generating one or more use scenarios comprises generating one or more use scenarios that test every transition between the MSCs.

10. The method of claim 9, wherein one or more of the validation test suites are operable to keep track of which transitions are actually visited during execution of the validation test suite.

11. The method of claim 1, wherein one or more of the validation test suites are operable to act as a state machine to interact with the system under test according to one or more of the use scenarios.

12. The method of claim 1, wherein the system under test comprises hardware, software, or a combination of hardware and software.

13. The method of claim 1, wherein the system under test comprises a finite state machine (FSM).

14. One or more non-transitory computer-readable tangible storage media, encoding software that is operable when executed to:
access a modeling language representation of a system under test, the representation comprising one or more Message Sequence Charts (MSCs), one or more of the MSCs comprising one or more conditional constructs including at least one or more guards or one or more loops;
generate one or more use scenarios based on the modeling language representation, wherein generating the one or more use scenarios comprises identifying and generating one or more use scenarios for each combination of two MSCs in the order indicated in a directed graph;
and generate one or more validation test suites based on the one or more use scenarios.

15. The media of claim 14, wherein one or more of the one or more conditional constructs comprise one or more transitions selected from the group consisting of one or more Alternatives, Options, Breaks, Parallels, Critical Regions, or Loops specified in Unified Modeling Language (UML).

16. The media of claim 14, wherein one or more of the MSCs are hierarchically arranged MSCs.

17. The media of claim 14, wherein one or more of the MSCs are deterministic.

18. The media of claim 14, wherein one or more of the MSCs are non-deterministic.

19. The media of claim 14, wherein the software being operable to generate one or more use scenarios comprises the software being operable to identify and generate one or more use scenarios for every MSC in a directed graph.

20. The media of claim 19, wherein the software being operable to generate one or more use scenarios for every MSC in a directed graph comprises the software being operable to use a postman algorithm to generate a postman tour of the directed graph.

21. The media of claim 19, wherein the software being operable to generate one or more use scenarios for every MSC in the directed graph comprises the software being operable to identify and generate use scenarios for every possible complete path through the directed graph.

22. The media of claim 14, wherein the software being operable to generate one or more use scenarios comprises the software being operable to generate one or more use scenarios that test every transition between the MSCs.

23. The media of claim 22, wherein the software being operable to generate one or more use scenarios that test every transition between the MSCs comprises the software being operable to keep track of which transitions are actually visited during execution of the software.

24. The media of claim 14, wherein one or more of the validation test suites are operable to act as a state machine to interact with the system under test according to one or more of the use scenarios.

25. The media of claim 14, wherein the system under test comprises hardware, software, or a combination of hardware and software.

26. The media of claim 14, wherein the system under test comprises a finite state machine (FSM).

\* \* \* \* \*